Patented Mar. 27, 1951

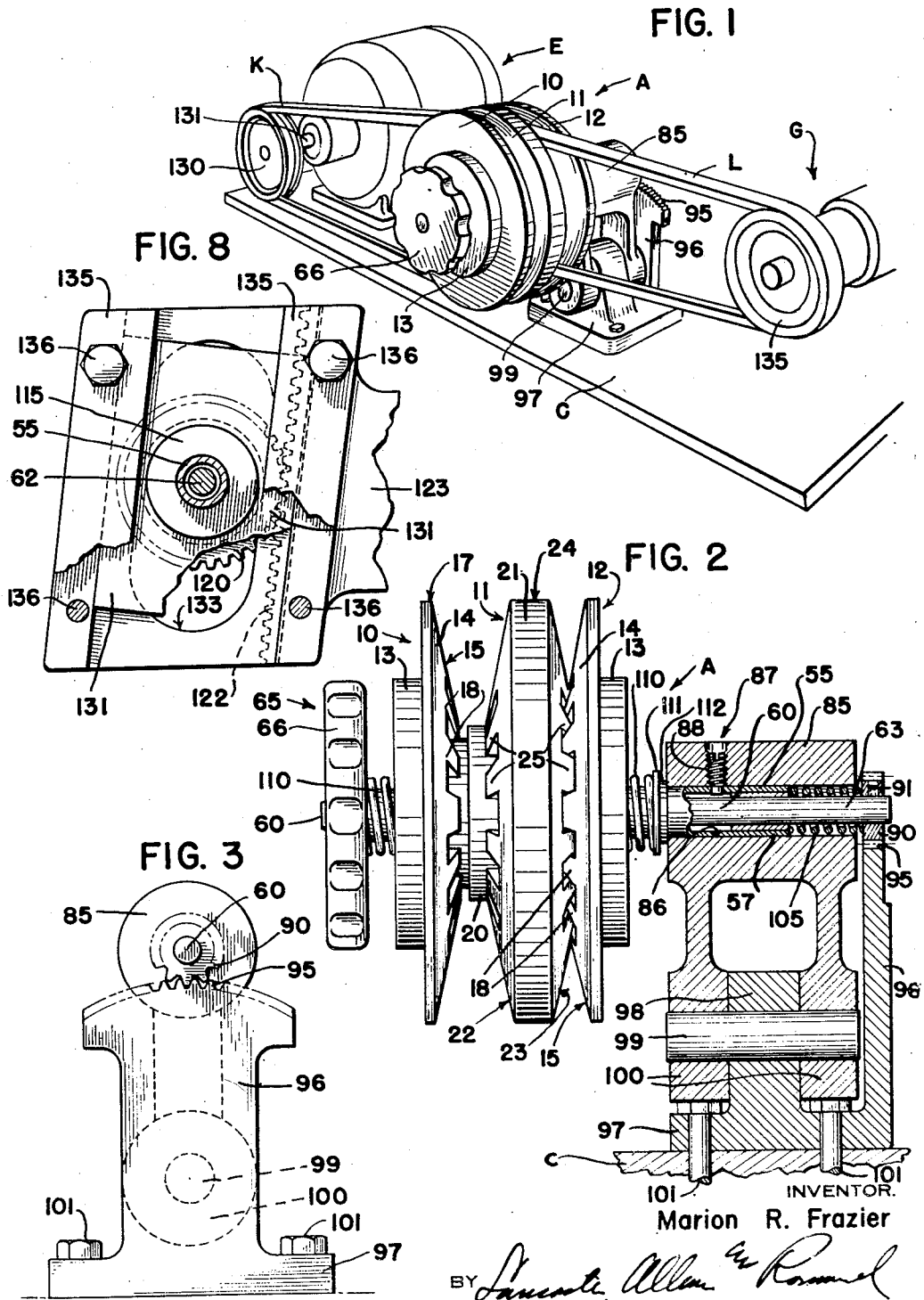

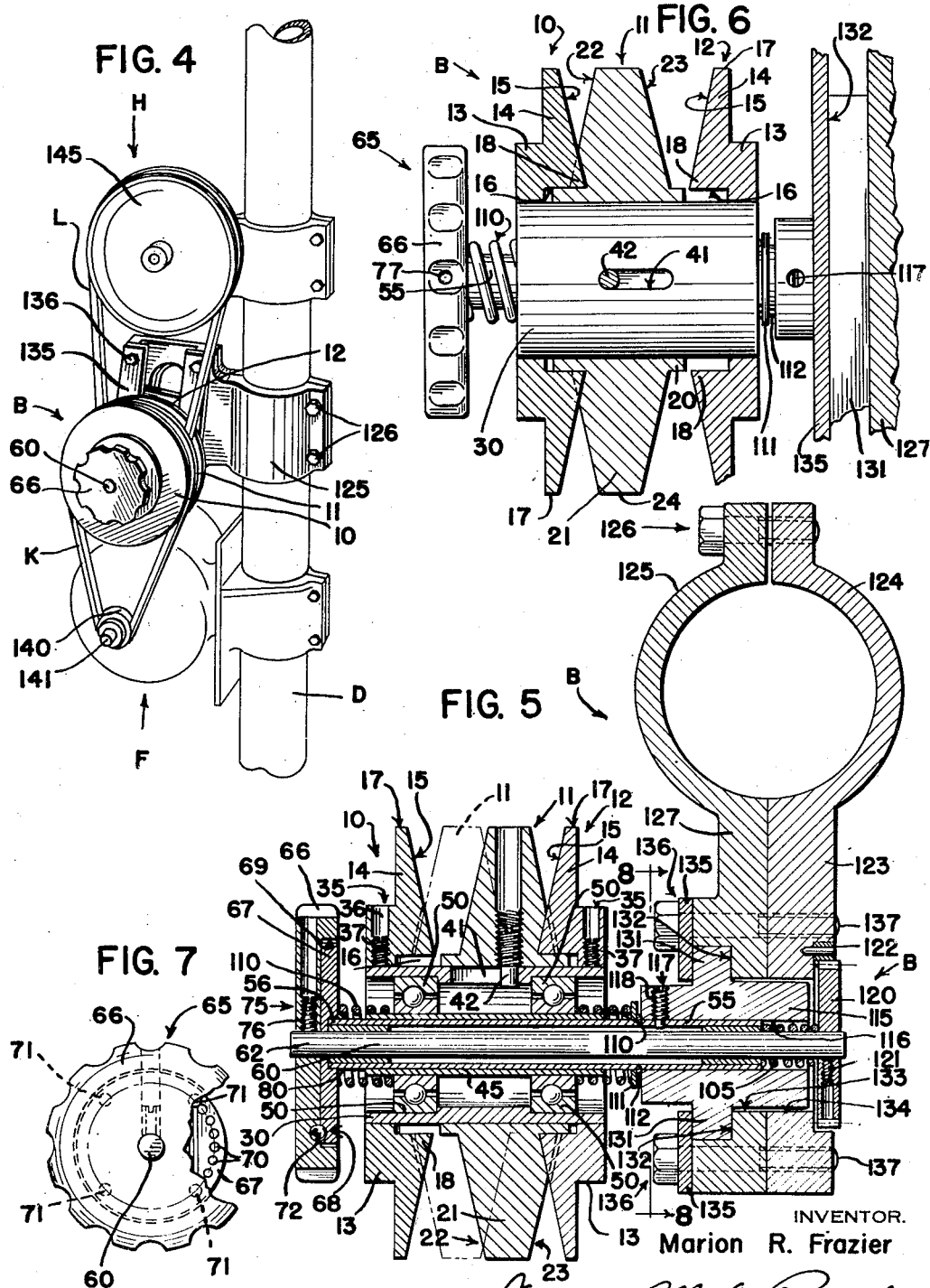

2,546,856

UNITED STATES PATENT OFFICE 2,546,856

VARIABLE-SPEED TRANSMISSION

Marion R. Frazier, Belleville, N. J.

Application September 27, 1949, Serial No. 118,052

10 Claims. (Cl. 74—230.17)

This invention relates to variable speed transmissions and more particularly to such mechanisms employing expansible pulleys consisting of conic portions.

An important object of the invention is to provide a mechanism of this kind in which the pitch diameters of the pulleys are manually varied by means of a minimum of parts, none being complicated, and the mechanism may be readily disassembled for replacement of parts in the field.

Another important object is to provide a mechanism as described in which the conic portions float on their respective shafts and are under spring tension.

Still another important object is to provide, in a mechanism of this kind, including V-belts, resilient means for the purpose stated above whereby the conic portions are axially shiftable for positive alignment with the respective V-belts.

A further important object is to provide the springs mentioned for functioning additionally to minimize vibrations of the V-belts during operation.

Another important object is to provide a floating assembly of conic portions, making up expansible pulleys, and their shaft arranged for running the pulleys on a common substantially horizontal axis at all times, thus obviating any tendency of the pulleys from hanging on the V-belts.

Furthermore, an additional important object is to provide these springs and their associated parts of the mechanism for maintaining a particularly close alignment between the driving and driven members so as to minimize wear and stress on the V-belts.

Included in the new variable speed transmission is a rack and pinion assembly, and an object of the invention is to provide resilient means to prevent creepage between the rack and pinion during operation of the mechanism.

Another object of the invention is to provide for hand wheel adjustment of the conic portions of the mechanism wherein there is a new and positive means to secure the hand wheel in an selected rotative position so that the pinion, movable only upon rotation of the hand wheel, is fixed against accidental rotation.

Other objects and advantages of the invention will be apparent during the course of the following detailed description of the invention, taken in connection with the accompanying drawings, forming a portion of this disclosure, and in which drawings:

Fig. 1 is a perspective view of one embodiment of the new variable speed transmission mounted upon a horizontally disposed, flat support, and by way of example, operatively associated with a prime mover and a driven mechanism.

Fig. 2 is a vertical longitudinal section of the transmission of Fig. 1.

Fig. 3 is an end elevation (right-hand end of Fig. 2) of the new transmission of Figs. 1 and 2 with the conic portions and hand wheel removed.

Fig. 4 is a perspective view of another embodiment of the new variable speed transmission associated, by way of example, with a vertically disposed tubular support, a prime mover and a driven mechanism.

Fig. 5 is a vertical section of the variable speed transmission of Fig. 4 but disclosing also mechanism common to both forms.

Fig. 6 is a fragmentary transverse section (with some portions in plan) of the transmission of Figs. 4 and 5.

Fig. 7 is a partly broken away elevation of the hand wheel assembly common to both forms.

Fig. 8 is a transverse section (enlarged) substantially on the line 8—8 of Fig. 5.

In the drawings, wherein for the purpose of illustration are shown two forms of the invention, and wherein similar reference characters designate corresponding parts throughout the several views, the letter A designates one form of the new variable speed transmission; B, another form thereof; C and D, two types of supports therefor; E and F prime movers; G and H driven mechanism; K, a drive belt and L a driven belt.

The new variable speed transmission A and B each have many portions of their structure in common, since each includes a plurality of pulleys comprising, in the example shown, three conic portions 10, 11 and 12, with the outermost portions 10 and 12 substantially alike, and providing portions of two pulleys, with the portion 11 forming the additional portion of both pulleys.

Each portion 10 and 12 has an outwardly-extending hub 13 and an inwardly-extending, pulley flange 14 extending from the hub and having an inclined face 15 providing one-half of a pulley groove. At the base portion of the flange is a circumferential groove 16 extending toward the hub 13 and, extending from the groove 16 toward the rim 17 of the flange 14, are spaced-apart teeth 18 which, of course, fall short of the rim 17. The portions 10 and 12 are disposed spaced apart and with the teeth of one projecting toward the teeth of the other.

The central or intermediate conic portion 11, comprises an outwardly-extending hub 20 and a pulley flange 21 mounted thereon and provided with two inclined faces 22 and 23, providing one-half of two pulley grooves. Extending from the projecting hub 20 toward the rim 24 are spaced apart teeth 25, to mesh with the teeth 18. The outwardly-projecting portions of the hub 20 are constructed and arranged to slide into and out of the grooves 16.

These conic portions 10, 11 and 12 are mounted upon an outer hollow, longitudinally-reciprocable shaft 30 having a smooth cylindrical outer periphery.

Means 35 to adjustably secure the two conic portions 10 and 12 to the shaft 30 may be the walls of a screw-threaded bore 36 extending from the outer periphery of each hub 13 to its inner periphery and a set screw 37 carried thereby and bearing against the shaft 30.

Means to slidably secure or key the conic portion 11 to the shaft 30 may be the walls of a longitudinally-extending slot 41 in the shaft 30 with its ends spaced a substantially equal distance from each end of the shaft, and a pin or key 42 extending into the slot 41 and carried by the portion 11, as by having its screw-threaded base portion screwed into a suitable screw threaded, radially-extending bore extending from the rim 24 to the inner periphery of the conic portion 11.

Inwardly of and spaced from the shaft 30 is a hollow, longitudinally-reciprocable shaft 45, preferably substantially as long as the shaft 30 and reciprocable therewith.

Bearing means 50 between the shafts 30 and 45 may be spaced-apart ball bearing races, inwardly of the ends of the shafts and with their outer rings in engagement with spaced-apart abutments extending from the inner periphery of the shaft 30 outwardly of the slot 41.

Inwardly of the shaft 45 is a spindle 55 on which the shaft 45 is slidably mounted. The spindle 55 extends outwardly of the shaft 45 and has a disc-coupled end portion 56 and a moving block-supported end portion 57.

A central shaft 60 extends through and outwardly beyond the spindle 55 and may be spaced therefrom as by suitable bearings 61 which are preferably disposed at the end portions 56 and 57. It has a hand wheel-carrying end portion 62 and pinion-carrying end portion 63.

The hand wheel assembly 65 comprises a suitable hand wheel 66, associated disc 67 and means 68 to couple the hand wheel 66 and disc 67. The latter is carried in a suitable recess 69 in the inner face of the hand wheel 66. The means 68 may be the walls of a plurality of equally spaced-apart concavities 70, in the recess-facing side of the disc 67, spaced an equal distance from its center, adapted to receive a portion of a suitable number of ball's 71 (such as four balls) disposed in and projecting from spaced-apart concavities 72 in the walls of the base of the recess 69.

Means 75 to detachably secure the hand wheel 66 to the central shaft 60 may be a set screw 76 bearing against the end portion 62 and extending through a screw-threaded, radially-extending bore 77 in the hand wheel wall.

Means 80 to secure the disc 67 to the spindle 55 may be solder, such as silver solder at the end portion 56 of this spindle.

All of the structure described is preferably common to both forms of the invention, and similar reference characters are employed, up to this point, in both forms to designate like parts.

Referring now particularly to Figs. 2 and 3, the end portion 57 of the spindle 55 may be secured to a movable block or bracket 85 which has a bore 86 to accommodate this end portion 57 as well as the pinion carrying end portion 63 of the central shaft 60 and a resilient means 105 to be subsequently described. The spindle 55 may be detachably secured to the block 85 as by key means 87 comprising a screw threaded key 88 extending through a suitable radial opening in the spindle 55 (in a snug fitting relationship) and a screw threaded bore extending through the block 85 to the bore 86.

Mounted upon the free end of the portion 63 where it projects from the block 85, is a pinion 90 which may be detachably coupled to the portion 63 as by set screw means 91 comprising a set screw extending through a radially-extending screw threaded bore in the pinion 90.

This pinion 90 meshes with the teeth of an arcuate rack 95 extending from a bracket arm 96. Looking downwardly upon the teeth, the rack is convex. The arm 96 is carried by a base 97 from which also extends (paralleling the arm 96) a pivot pin accommodating bearing 98 carrying a pivot pin 99 which extends through the leg portion 100 of the block 85 whereby the block may be moved in an arcuate path but is not movable longitudinally of the transmission A. The base 97 may be detachably secured to a suitable support as the support C, as by bolts 101.

Referring now to the important resilient means which are common to both forms A and B and could not be well described without initial reference to the block and the pinion, there is provided resilient means 105 to prevent creepage of the pinion 90 with respect to the rack 95, and comprising an expansion spiral spring with one end bearing against the pinion 90 and the other end bearing against the end portion 57 of the spindle 55, thus attempting to force the central shaft 60 to the right in Fig. 2 but this tends to force the hand wheel 66 tightly against the disc 67 which is immovable longitudinally of the spindle 55 and the latter is also immovable longitudinally since it is keyed to the block 85 by the means 87. This affords a good friction brake against the undesirable creepage mentioned. I have found that each of the springs of the means 105 may be of .062 music wire, formed into six coils, having a free length, when spiralled, of substantially one inch and an exterior diameter of ⅞ inch.

The other resilient means 110 permits the conic portions to float on their respective shafts, under spring tension, so that they are axially shiftable for positive alignment with the respective V-belts. This means 110 also minimizes vibrations of the V-belts during operation as well as prevents the conic portions from hanging on the belts. In addition, the means 110 tends to cause closer alignment between the driven and driving members, preventing undue wear and stress on the belts. The means 110 comprises two expansion spiral springs, one bearing at one end against the disc 67 (which thus provides an abutment) and against the innermost ring of one ball bearing race of the means 50, while the other expansion spiral spring of the means 110 bears at one end against the innermost ring of the other ball bearing race and bears, at its other end against a suitable abutment as a washer 111 mounted on the spindle 55 preferably closely adjacent the inner end of the block 85 and held in place by a slip ring 112 fitted into a suitable peripheral groove in the spindle 55. By way of example, I have found that a spring of .074 music wire, formed into eleven coils, having a free length, when spiralled, of substantially 1½ inches and an exterior diameter of ⅝ inch is desirable for the spring 110.

The form B contemplates a movable block or bracket 115 to which the end portion 57 of the spindle 55 may be secured. This block 115 has a bore 116 to accommodate the end portion 57 as well as the pinion-carrying end portion 63 of the central shaft 60 and the resilient means 105.

The spindle 55 may be detachably secured to the block 115 as by key means 117 (like the means 87) comprising a screw threaded key 118 extending through a suitable opening in the spindle 55, and a screw threaded bore extending through the block to the bore 116.

In the form B, the pinion 120 is preferably larger in diameter than the pinion 90 but, like it, it is mounted on the free end of the portion 63 as by a set screw means 121.

The teeth of the pinion 120 meshes with the teeth of a rack 122 (best shown in Fig. 8) carried by a bracket arm 123. Viewed with the bracket arm substantially horizontal (as in Fig. 4) the rack is longitudinally inclined from the vertical (substantially as in Fig. 8).

The arm 123 is carried by a half ring base 124, there being a second half ring base 125 so that the two may be detachably coupled as by the screw means 126 in order to clamp the two at a suitable tubular support D.

The base 125 also carries an arm 127 paralleling the arm 123 with the inner faces of the arms in face contact.

Means to permit movement of the block 115 as the pinion 120 moves over the inclined rack 122 may be a pair of tongues 131 extending outwardly of the block 115 in opposite directions and extending into suitable grooves 132 in the arm 127, while the other portions of the block within the arms 123 and 127 are accommodated in suitable inclined slots 133 and 134 respectively.

It will be noted that the walls of grooves 132 include two suitable cover plates 135 secured to the arm 127 as by screws 136 which also are employed to secure the arm 123 to the arm 127 since their shanks 137 extend into both arms. This permits detachment from the bracket arms of the block 115 after removal of the pinion and loosening of the means 117.

In both forms A and B, the row of teeth of each rack is inclined both from the vertical and horizontal.

In Fig. 1 the new variable speed transmission A is operatively associated with a prime mover E, as an electric motor, through the drive V-belt K which is trained over a pulley 130 mounted upon the motor shaft 131 and trained over the expansible pulley represented by the conic portion 10 and facing part of the conic portion 11. Over the expansible pulley, represented by the conic portion 12 and the facing part of the conic portion 11, is trained a driven V-belt L which is also trained over a pulley 135 of a driven mechanism G.

In the case of the variable speed transmission B of Fig. 4 for example, the same is clamped to the tubular support D, employing the bracket 123—127, and operatively associated with a prime mover F by means of a V-belt K trained over a pulley 140 mounted upon the shaft 141 of the motor, and this belt as well as the belt L are associated with the transmission mechanism B exactly like the similar belts are associated with the transmission mechanism A. The belt L is trained over a pulley 145 of the driven mechanism H of Fig. 4.

Manual rotation of the hand wheel assembly 65 of either form A or B will cause the entire mechanism (minus the brackets, except the bracket or heads 85 and 115) of either form A or B to move toward or away from the prime mover E or F, as the case may be and, consequently, move away from or toward the driven mechanism G or H, as the case may be. These movements are compensated for by longitudinal movements of the conic portion 11, along the shaft 30, whereby the distances of those portions of the belts K and L (trained over the expansible pulleys) from the axis of rotation of the conic portions 10, 11 and 12 will be increased or decreased, as the case may be, thus effecting variations in the speed of transmission of power to the driven mechanisms. When a desired speed is secured, the operator can release the hand wheel, knowing that the distances of the mechanism of A or B from their associated prime movers and driven mechanisms will remain fixed, until again manually altered.

The two springs of the resilient means 119 are, of course, substantially alike and provide with the shaft 30, for a floating rotative support for the expansible pulleys, while the conic portion 11 is readily shiftable with respect to the portions 10 and 12, such as from the position in full lines to the position shown in dots and dashes in Fig. 5. (This latter position is shown in full lines in Fig. 6.)

The connection of the hand wheel 66 and disc 67 through the medium of the balls 71 and walls of their sockets 70 and 72 permits the operator to pull outwardly upon the hand wheel 66 when he desires to rotate it, thereupon permitting the balls 71 to ride out of the sockets 70 and thus detach the hand wheel from the disc which is fixed against rotation. When the balls are within their sockets, the hand wheel cannot accidentally rotate. Normally, the hand wheel is drawn toward the disc 67 by the resilient means 105 as stated.

Various changes may be made to the forms of the invention herein shown and described without departing from the spirit of the invention or scope of the claims.

What is claimed is:

1. In a variable speed transmission, a longitudinally-reciprocable hollow shaft; a plurality of expansible pulleys mounted thereon, each comprising an outer portion and a section of an intermediate portion next adjacent to the outer portion, each outer portion having a belt-contacting face and the intermediate portion having two belt-contacting faces, one facing one of said first faces and the other facing the other of said first faces, whereby two pulley grooves are provided; means securing the outer sections to said shaft in spaced apart relationship with said faces thereof in facing relationship; means securing said intermediate portion to said shaft to slide longitudinally thereof; ball bearings, comprising races having inner and outer rings, for said shaft; a V-belt for each expansible pulley and with portions of said belts in said grooves; a pair of abutments normally spaced outwardly from the outer ends of said shaft a substantially equal distance; and means for yieldably resisting moving said shaft longitudinally upon wedging pressure of one of said belts against a belt-contacting face of either of said outer portions, including a member inwardly of said shaft, mounting said bearings and slidable with said shaft, and a pair of expansion spiral springs with one like end of each bearing against the innermost rings of said bearings and the other like end of each bearing against said abutments, said innermost rings being mounted directly upon said member and said outermost rings being in peripheral contact with the inner periphery of said hollow shaft.

2. In variable speed transmission, a fixed support; a movable support carried thereby; a rigid spindle mounted upon said movable support and projecting therefrom; means carried by said fixed support for guiding said movable support in a path inclined from the vertical and horizontal; a shaft rotatably and longitudinally slidably carried by said spindle; expansible pulleys operatively-mounted upon said shaft; and manually-operable means to permit movement of said support in said path, including a pinion fixed to said spindle and a rack fixed to said fixed support, said rack having a row of teeth with the row inclined from the vertical and horizontal.

3. In variable speed transmission, a fixed support; a movable support carried thereby; a rigid spindle mounted upon said movable support and projecting therefrom; means carried by said fixed support for guiding said movable support in a path inclined from the vertical and horizontal; a shaft rotatably and longitudinally slidably carried by said spindle; expansible pulleys operatively mounted upon said shaft; manually-operable means to permit movement of said support in said path, including a pinion fixed to said spindle and a rack fixed to said fixed support, said rack having a row of teeth with the row longitudinally arcuate.

4. In variable speed transmission, a fixed support; a movable support carried thereby; a rigid spindle mounted upon said movable support and projecting therefrom; means carried by said fixed support for guiding said movable support in a path inclined from the vertical and horizontal; a shaft rotatably and longitudinally slidably carried by said spindle; expansible pulleys operatively mounted upon said shaft; manually-operable means to permit movement of said support in said path, including a pinion fixed to said spindle and a rack fixed to said fixed support, said rack having a row of teeth with the row longitudinally curved.

5. In variable speed transmission, a fixed support; a movable support pivotally carried thereby; a rigid spindle mounted upon said movable support and projecting therefrom; means carried by said fixed support for guiding said movable support in a path inclined from the vertical and horizontal; a shaft rotatably and longitudinally slidably carried by said spindle; expansible pulleys operatively mounted upon said shaft; manually-operable means to permit movement of said support in said path, including a pinion fixed to said spindle and a rack fixed to said fixed support, said rack having a row of teeth with the row longitudinally curved.

6. In variable speed transmission, a fixed support; a movable support slidably carried thereby; a rigid spindle mounted upon said movable support and projecting therefrom; means carried by said fixed support for guiding said movable support in a path inclined from the vertical and horizontal; a shaft rotatably and longitudinally slidably carried by said spindle; expansible pulleys operatively mounted upon said shaft; manually-operable means to permit movement of said support in said path, including a pinion fixed to said spindle and a rack fixed to said fixed support, said rack having a row of teeth with the row inclined from the vertical and horizontal.

7. In a variable speed transmission, a fixed support including an elongated bracket provided with a transversely extending slot, inclined from the vertical and horizontal, and a groove opening into said slot and inclined from the vertical and horizontal; a movable block carried within said slot and having a tongue extending into said groove, said slot and groove being longer than the width of said block; a rigid spindle carried by said block and projecting therefrom and outwardly of said slot and fixed support; a shaft within said spindle and rotatable and slidable therein; expansible pulleys operatively mounted upon said shaft; manually-operable means carried partly by said shaft to permit movement of said block along said slot and said tongue along said groove; and means cooperating with said manually operable means to releasably retain said block at predetermined locations along said slot.

8. In a variable speed transmission, a fixed support including an elongated bracket provided with a transversely extending slot, inclined from the vertical and horizontal, and a groove opening into said slot and inclined from the vertical and horizontal; a movable block carried within said slot and having a tongue extending into said groove, said slot and groove being longer than the width of said block; a rigid spindle carried by said block and projecting therefrom and outwardly of said slot and fixed support; a shaft within said spindle and rotatable and slidable therein; expansible pulleys operatively mounted upon said shaft; manually-operable rack and pinion means to permit movement of said block along said slot and said tongue along said groove; and means cooperating with said manually operable means to releasably retain said block at predetermined locations along said slot.

9. In a variable speed transmission, an outermost hollow, rotatable and longitudinally reciprocable shaft; expansible pulleys mounted thereon; a second hollow rotatable and longitudinally reciprocable shaft within and spaced from the first shaft; bearings between the two shafts; a spindle extending through the second shaft; a movable support for the spindle; a fixed support for the movable support; a floating connection between the spindle and bearings; and means to permit movement of said shafts, pulleys, bearings, spindle, connection and movable support, as a unit, in a path inclined from the vertical and horizontal, said path being normal to the longitudinal axis of said shafts and spindle.

10. In a variable speed transmission, an outermost hollow, rotatable and longitudinally reciprocable shaft; expansible pulleys mounted thereon; a second hollow rotatable and longitudinally reciprocable shaft within and spaced from the first shaft; bearings between the two shafts; a spindle extending through the second shaft; a movable support for the spindle; a fixed support for the movable support; a floating resilient connection between the spindle and bearings, and means to permit movement of said shafts, pulleys, bearings, spindle, connection and movable support, as a unit, in a path inclined from the vertical and horizontal, said path being normal to the longitudinal axis of said shafts and spindle.

MARION R. FRAZIER.

REFERENCES CITED

The following references are of record in the file of this patent:

UNITED STATES PATENTS

| Number | Name | Date |
| --- | --- | --- |
| 2,152,207 | Needham | Mar. 28, 1939 |
| 2,186,477 | Coddington | Jan. 9, 1940 |
| 2,235,122 | Shaw | Mar. 18, 1941 |
| 2,253,921 | VanSant | Aug. 26, 1941 |
| 2,293,230 | Waltz | Aug. 18, 1942 |

FOREIGN PATENTS

| Number | Country | Date |
| --- | --- | --- |
| 170,115 | Great Britain | Mar. 29, 1921 |